Patented May 15, 1945

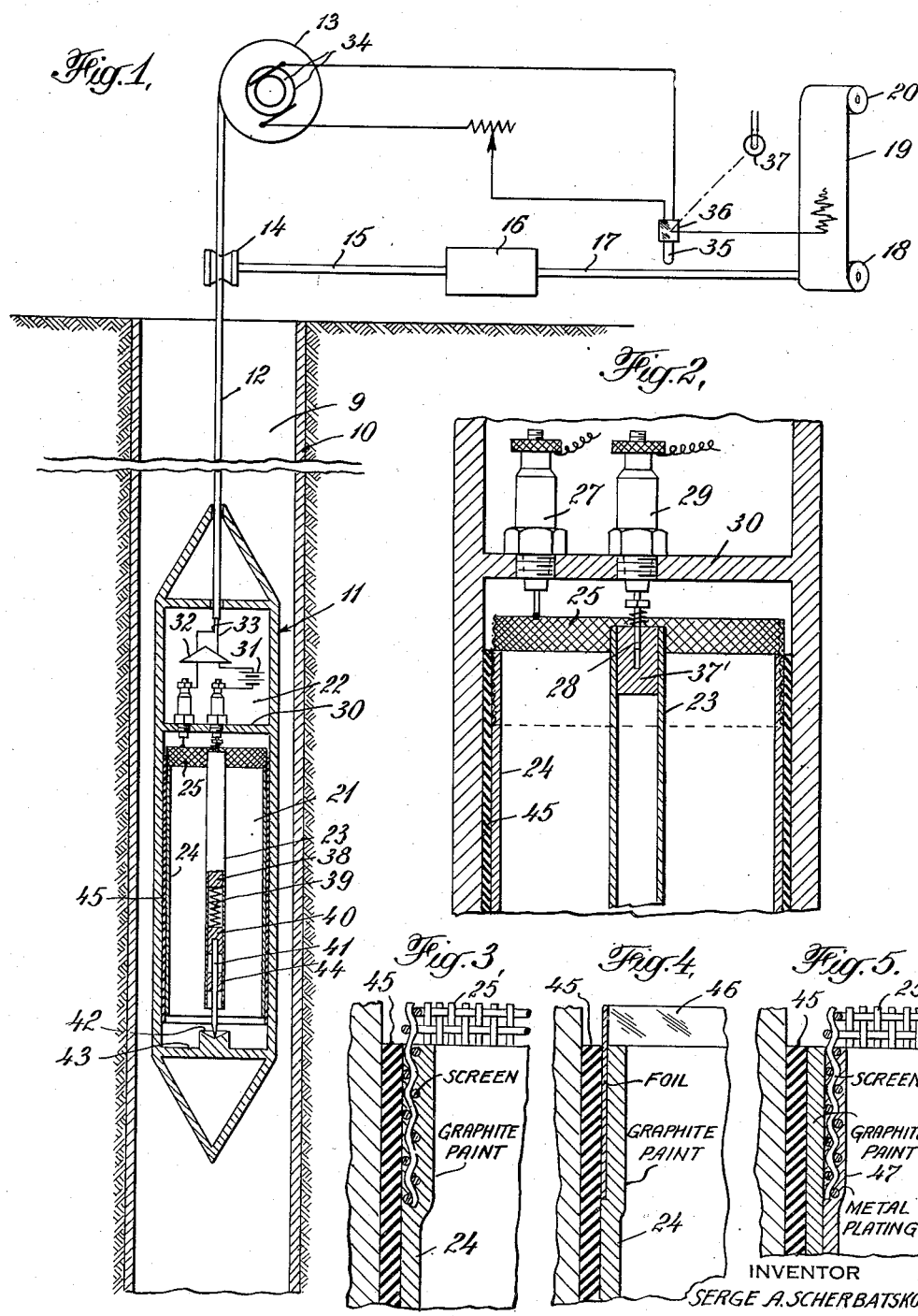

2,376,196

UNITED STATES PATENT OFFICE 2,376,196

IONIZATION CHAMBER

Serge Alexander Scherbatskoy, Tulsa, Okla., assignor to Well Surveys, Incorporated, Tulsa, Okla., a corporation of Delaware Application September 30, 1943, Serial No. 504,408

10 Claims. (Cl. 250—83.6)

This invention relates generally to improvements in apparatus for detecting and measuring radiations caused by nuclear disintegrations such as gamma rays, neutrons, etc., and the method of manufacturing such apparatus, and, more specifically, to apparatus adapted for use in logging drill holes which penetrate the substrata of the earth.

Heretofore many instruments have been designed for the purpose of detecting and measuring radiations due to radio-activity or to other nuclear disintegrations. A number of these have proved to be impractical for use in surveying drill holes due to their size. An instrument to be practical for use in surveying drill holes must be of a size sufficiently small that it can be placed within a capsule that is designed to withstand the excessive pressures encountered at the depths to which drill holes are drilled for the purpose of producing oil. Of these instruments the most popular is the ionization chamber which comprises a pair of concentric electrodes that are disposed within an ionizable medium that is usually under super-atmospheric pressure. A potential placed across these electrodes will, on subjecting the ionizable medium to radiations caused by radio-activity, cause an ionization of the medium surrounding the electrodes resulting in a current flow that is directly proportional to the detected radiations.

The electrodes used in the ionization chamber prior to this invention have consisted of a central electrode in the form of a metallic rod or tube of small diameter and an outer electrode in the form of a metallic cylinder that is concentrically spaced from the central electrode. These electrodes have been mounted within pressure-withstanding capsules out of contact with the inner wall thereof. Such mounting necessitated the use of spacing material between the inner wall of the capsule and the outer electrode such as an insulating material sold on the market under the trade name of "Rock Wool" and "Fiberglas." The use of insulating material between the outer electrode and the inner wall of the capsule has caused considerable trouble in field operations due to the fact that the instrument is subjected to fairly rough handling which jolts the insulating material and causes it to settle in the bottom of the capsule leaving voids in the space between the top of the outer electrode and the inner wall of the capsule. This shifting of the insulating material also tends to shift the position of the outer electrode resulting in a change in capacity between it and the wall of the capsule. Additionally, these electrodes required special mechanical means for holding them in spaced relation within the capsule, both from the inner wall of the capsule and the ends thereof, as well as in spaced relationship to each other.

The present invention is directed to an apparatus that is inherently free of the above-enumerated objectionable features in the conventional ionization chamber and is directed to an ionization chamber that has the conventional central electrode but is provided with a novel outer electrode that is formed by first painting the inside of the capsule with an insulating varnish such as that sold on the market under the name of "Westinghouse Synthetic Baking Varnish—Clear,—7826-2" and carrying the trade name "Westinghouse Tuffernell Insulating Material." The above varnish can be thinned by toluol of the grade such as that sold on the market by Westinghouse, No. 5052. There is then placed on this insulating coat a coating of graphite paint that forms a conducting surface or outer electrode for the ionization chamber. This graphite paint is a dispersion of colloidal graphite in an aqueous medium and is of the type produced by Acheson Colloids Corp. and sold on the market under the trade name of "Dag Graphite SR-2." The insulating varnish serves as a dielectric between the outer electrode and the inner wall of the capsule. Although a particular varnish has been described as suitable for use in this particular instance, it is obvious to those skilled in the art that any good baking varnish that will withstand the temperatures encountered in surveying a bore hole can be used.

As a modification of the present invention the graphite paint can be used as a base on which copper or other metals can be plated to form an outer metallic electrode for the ionization chamber.

To form an electrical connection to the outer electrode which comprises the coating of graphite paint, a screen wire band is cemented to the insulating varnish before the graphite paint is applied. Then the graphite paint is directly applied to the screen wire band. Electrical conductors can then in the usual manner be soldered to the screen wire band.

It is obvious to those skilled in the art that metal foil may be used in the place of screen to form the connection between the electrode and a conductor leading thereto.

Therefore, the primary object of this invention resides in the provision of an ionization chamber having at least one of its electrodes formed of a conductive paint.

Another object of this invention resides in the provision of novel means for making electrical connection to an ionization chamber electrode that is formed of a conductive paint.

Still another object of this invention resides in the novel method of forming electrodes for ionization chambers.

This invention also contemplates the provision of a metallic outer electrode for an ionization chamber that is formed by electroplating a metal such as copper on a base formed of a conductive paint.

Still other objects and advantages of the present invention will become apparent from the following detailed description when considered with the drawing in which:

Figure 1 is a diagrammatical illustration of apparatus whereby the present invention can be practiced shown in operative relationship with a drill hole, Figure 2 is an enlarged fragmentary section of the ionization chamber forming the subject matter of the present invention showing the disposition of the electrodes therein with respect to the housing or capsule, Figure 3 is an enlarged fragmentary section of a portion of the ionization chamber showing the manner in which electrical connection is made to the paint electrode, Figure 4 is an enlarged fragmentary view shown in section of a modification of the instant invention showing the use of metal foil for making electrical connection to the outer electrode of the ionization chamber, and Figure 5 is a further modification of the instant invention showing an outer electrode of the ionization chamber formed by a metal that has been electroplated on a conductive base such as graphite paint.

Referring to the drawing in detail, particularly Figure 1, a drill hole 9 is shown penetrating the formation to be explored. The drill hole may or may not be provided with a tubular metallic casing such as designated by 10.

The exploratory apparatus proper consists of a housing 11 which is lowered into the bore hole by means of a cable 12, containing insulated conductors. The cable has a length somewhat in excess of the length of the hole to be explored and is normally wound on a drum 13 positioned adjacent to the top of the drill hole. The cable may be unwound from the drum 13 to lower the exploring apparatus into the hole and may be rewound upon the drum to raise the exploring apparatus. Between the drum 13 and the hole there is a measuring reel 14 which is adjusted to roll on cable in such a manner that the number of revolutions of the reel corresponds to the amount of cable which has passed up or down in the drill hole. The reel is mounted on a shaft 15, and the motion of the shaft is transmitted through a gear box 16 to another shaft 17 which turns a spool 18 to wind a photographic film 19, the film being supplied from a feed spool 20. The housing 11 of the exploratory apparatus comprises two parts respectively designated by the numbers 21 and 22. The lower portion 21 of the housing 11 has formed therein an ionization chamber comprising a central electrode 23 and an outer concentrically disposed electrode 24. The electrical connection is made between the outer electrode 24 and the partition 22 by means of a conductor 25 and the pressure connector 27, while electrical connection is made between the central electrode 23 and the upper chamber 22 by means of the conductor 28 and the pressure connector 29. The pressure connectors 27 and 29 are in the form of spark plugs which have had their outer electrode cut off. These plugs are carried by a transverse partition 30 forming the top of the ionization chamber.

In the chamber 22 there is disposed a battery 31 adapted to impress a potential across the electrodes 23 and 24. The battery 31 is connected in series with the electrodes and the input of a D. C. amplifier 32 also disposed within the chamber 22. The output of the D. C. amplifier is connected by means of conductors 33 to a pair of slip rings 34 on the drum 13. The conductors 33 are enclosed within the cable 12 which is provided with suitable shielding. Current is conducted from the ionization chamber through the D. C. amplifier 32 conductors 33 in the cable 12 to the drum 13 through the slip rings 34 to a recording galvanometer. The recording galvanometer comprises a vibrating element 35 which carries a mirror 36 that is adapted to reflect light from a source 37 onto a moving sensitized paper or photographic film 19 that is driven by the roll 18 in correlation with the depth at which the housing 11 is located in the bore hole.

The ionization chamber formed in the chamber 21 of the housing 11 comprises a central electrode 23 which may be solid or, as shown, formed of tubing. The tube 23 as shown in Figure 2 is provided with a metallic plug 37' of a metal such as brass that is conductively fixed in the upper end thereof by means of which electrical connection can be made by its threaded engagement with the conductor 28 of the connector 29. The lower end of the tubular electrode 23 is resiliently supported as shown in Figure 1. There is disposed within the tube 23 at a point intermediate the ends thereof a second plug 38 that is secured to the inner walls of the electrode 23 and forms a stop for the upper end of a spring 39. The lower end of the spring 39 presses against a piston-like member 40 that engages a rod 41 of insulating material such as quartz. The rod 41 extends to a point outside the lower end of the tubular electrode and its lower end rests in a socket 42 formed on the bottom 43 of the ionization chamber. There is provided within the lower end of the tubular electrode a rod guide 44 to maintain the electrode centrally disposed within the ionization chamber. The outer concentrically disposed electrode 24 is formed first by coating the inner cylindrical wall of the chamber 21 with an insulating varnish to form an insulator 45. A varnish suitable for this purpose is sold on the market under the name of "Westinghouse Synthetic Baking Varnish—Clear,—7826-2" and carries the trade name "Westinghouse Tuffernell Insulating Material." In order to apply this varnish to the inner cylindrical wall of chamber 21 it is thinned by the addition thereto of toluol of the grade such as that sold on the market by Westinghouse and designated by the number 5052. This varnish is then baked to harden it in the conventional manner, after which a conductor 25 in the form of a conductive metal screen, such as copper, is cemented to the top surface of the varnish as shown in Figures 2 and 3. Then a coat of graphite paint such as that sold on the market under the trade name of "Dag Graphite SR-2" is applied to the inner surface of the insulator 45 and over the screen that has been cemented to the top inner surface of the insulator 45. This coat of graphite paint thus forms an outer metallic electrode for the ionization chamber which is connected electrically to the screen 25. Screen 25 can be electrically connected to the conductor in the plug 27 in any conventional manner such as by soldering, welding or by means of nuts.

The electrodes 23 and 24 are disposed in an ionizable medium such as argon under super-atmospheric pressure for the detection of gamma rays or hydrogen under super-atmospheric pressure for the detection of neutrons. Although only two ionizable mediums are specifically disclosed herein, it is obvious to those skilled in the art that others will operate equally as well.

In operation, the capsule 11 containing the ionization chamber and its associated battery and amplifier, is lowered into a drill hole to expose the ionization chamber to radiations from the substrata. Radiations passing from the substrata into the ionization chamber produce an ionization of the ionizable medium carried therein resulting in a current flow in the electrode circuit that is directly proportional to the intensity of the detected radiations. This current is amplified in the amplifier 22 and transmitted through the conductors 33 in the cable 12 to the measuring drum 13, through the slip ring 34 to the recording galvanometer described above. Here these currents are recorded in correlation with the depth at which they were detected on the moving sensitized paper or film 19 that is driven through the gear box 16 of the measuring wheel 14 by the cable 12 as it is lowered into or withdrawn from the drill hole depending upon whether the survey is being made while lowering the capsule into the drill hole or is being made while withdrawing the capsule from the drill hole.

A modification of the present invention is disclosed in Figure 4 wherein there is shown, instead of the metallic screen 25 of Figure 2, a metallic foil 46 which has been cemented to the inner surface of the insulator 45, formed of the insulating varnish, before the conductive graphite paint has been applied to form the inner electrode 24 of the ionization chamber. Connection is made to the metal foil in the same manner as that described in connection with the metallic screen.

A still further modification of the present invention is disclosed in Figure 5 in which there is shown an outer electrode 47 which has been formed by plating a metal such as copper on the graphite paint which serves as a conductive base therefor.

I claim:

1. An ionization chamber adapted for use in detecting radiations caused by nuclear disintegrations that comprises a housing, an ionizable medium in said housing, a coat of insulating varnish carried by the inner wall of said housing, at least two electrodes disposed within said housing in the ionizable medium, one of said electrodes being a conductive paint that is applied to the inner surface of the insulating varnish that is carried by the inner wall of the housing, and conductors leading from the electrodes to a point outside of the housing for electrical connection to said electrodes.

2. An ionization chamber adapted for use in apparatus for making a radioactivity survey of a drill hole that comprises a housing of transverse dimensions sufficiently small that it can be lowered into a drill hole, an insulator carried by the inner wall of said housing, an ionizable medium in said housing under super-atmospheric pressure, at least two electrodes disposed within said housing and within the ionizable medium, at least one of said electrodes being a conductive paint that is applied to the inner surface of the insulator that is carried by the inner wall of the housing, and conductors connected to the electrodes and extending to a point outside of the housing for electrical connection to them.

3. An electrometer adapted for use in making radioactivity logs of drill holes having transverse dimensions sufficiently small that the electrometer can be introduced into the mouth of a drill hole and moved therein, a housing for said electrometer formed of material having sufficient strength to withstand pressures encountered throughout the depth of the drill hole to be logged, means for dividing said housing into a bottom ionization chamber and a top apparatus chamber, said ionization chamber having an ionizable medium therein, an insulating surface on the inner wall of said chamber, at least two electrodes disposed within said ionizable medium, one of said electrodes being a conductive paint that is applied to the insulating surface carried by the inner wall of the ionization chamber, conductors connected to said electrodes that extend through the dividing means into the apparatus chamber, means in said apparatus chamber connected to said conductors for placing an electrical potential on said electrodes, and additional means in said apparatus chamber connected to said conductors for amplifying currents flowing in the electrode circuit, and means for conducting the amplified currents to a point outside of the electrometer housing.

4. An ionization chamber adapted for use in detecting radiations caused by nuclear disintegrations that comprises in combination a housing, an ionizable medium in said housing under super-atmospheric pressure, a coat of insulating varnish carried by the inner wall of said housing extending substantially to the top and bottom thereof, a metal screen conductor, means of cementing the conductor to the inner surface of the coat of insulating varnish, a pair of electrodes disposed within the ionizable medium in spaced relation to each other, one of said electrodes being a coat of graphite paint that is carried by the inner surface of the coat of insulating varnish and which extends over the surface of the screen to make electrical contact therewith, electrical conductors connected respectively to the screen and other electrode, extending to a point outside of the housing, whereby electrical connection can be made with the electrodes in the ionization chamber.

5. An ionization chamber adapted for use in detecting radiations caused by nuclear disintegrations that comprises in combination a housing, an ionizable medium in said housing under super-atmospheric pressure, a coat of insulating varnish carried by the inner wall of said housing extending substantially to the top and bottom thereof, a metal foil conductor, means of cementing the conductor to the inner surface of the coat of insulating varnish, a pair of electrodes disposed within the ionizable medium in spaced relation to each other, one of said electrodes being a coat of graphite paint that is carried by the inner surface of the coat of insulating varnish and which extends over the surface of the foil to make electrical contact therewith, electrical conductors connected respectively to the foil and other electrode, extending to a point outside of the housing whereby electrical connection can be made with the electrodes in the ionization chamber.

6. A method of manufacturing an ionization chamber having a housing formed of material of sufficient strength to withstand pressures such as those encountered throughout the depth of a drill hole that comprises the steps of: concentrically disposing within the housing a pair of electrodes, the outer electrode being formed by first applying to the inner wall of the housing a coat of insulating varnish, cementing a conductor in the form of a screen to the inner surface of the varnish, applying to the inner surface of the varnish in such a manner that it also covers a portion of the screen a conductive paint and filling the space between the electrodes with an ionizable medium under superatmospheric pressure.

7. A method of making electrical connection to an electrode of an ionization chamber that has been formed by a coat of conductive paint that comprises the steps of first cementing to the base formed of an insulating material a conductor in the form of a screen, applying the conducting paint over the surface of the insulator and over the screen in such a manner that it electrically contacts the screen and securing electrical conductors by soldering or other known manner to said screen.

8. A method of forming an electrode for an ionization chamber that comprises the steps of: coating the inner surface of the housing defining said chamber with an insulating varnish, cementing a conductor to the inner surface of said varnish, applying a coat of conductive paint to the inner surface of said varnish and over a portion of said conductor and electroplating the inner surface of the conductive paint with a conductive metal.

9. A method of forming an electrode for an ionization chamber that comprises the steps of: coating the inner surface of the housing defining said chamber with an insulating varnish, cementing a conductor in the form of a metal screen to the inner surface of said varnish, applying a coat of conductive paint to the inner surface of said varnish and over a portion of said conductive screen and electroplating the inner surface of the conductive paint with a conductive metal.

10. A method of forming an electrode for an ionization chamber that comprises the steps of: coating the inner surface of the housing defining said chamber with an insulating varnish, cementing a conductor in the form of a metal foil to the inner surface of said varnish, applying a coat of conductive paint to the inner surface of said varnish and over a portion of said conductive foil and electroplating the inner surface of the conductive paint with a conductive metal.

SERGE ALEXANDER SCHERBATSKOY.